United States Patent
Eberlein

(10) Patent No.: US 10,230,708 B2
(45) Date of Patent: Mar. 12, 2019

(54) APPLICATION MANAGED SERVICE INSTANCES

(71) Applicant: SAP SE, Walldorf (DE)

(72) Inventor: Peter Eberlein, Malsch (DE)

(73) Assignee: SAP SE, Wallforf (DE)

( * ) Notice: Subject to any disclaimer, the term of this patent is extended or adjusted under 35 U.S.C. 154(b) by 258 days.

(21) Appl. No.: 15/160,820

(22) Filed: May 20, 2016

(65) Prior Publication Data
US 2017/0339121 A1  Nov. 23, 2017

(51) Int. Cl.
H04L 29/06 (2006.01)
G06F 17/30 (2006.01)

(52) U.S. Cl.
CPC ........ H04L 63/08 (2013.01); G06F 17/30292 (2013.01); H04L 63/10 (2013.01)

(58) Field of Classification Search
CPC ....... H04L 63/08; H04L 63/10; H04L 63/102; H04L 67/42; G06F 17/30292
See application file for complete search history.

(56) References Cited

U.S. PATENT DOCUMENTS

| | | | |
|---|---|---|---|
| 7,523,142 B2 | 4/2009 | Driesen et al. |
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,356,010 B2 | 1/2013 | Driesen |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,479,187 B2 | 7/2013 | Driesen et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |

(Continued)

OTHER PUBLICATIONS

U.S. Appl. No. 14/960,983, Eberlein, et al.
U.S. Appl. No. 15/083,918, Eberlein et al.
U.S. Appl. No. 15/087,677, Eberlein, et al.

Primary Examiner — Hadi S Armouche
Assistant Examiner — Alexander R Lapian
(74) Attorney, Agent, or Firm — Fish & Richardson P.C.

(57) ABSTRACT

A request is received from a deployer associated with an application to create an instance broker service instance. A request is received from the deployer to bind the instance broker service instance to the application. Instance broker credentials associated with the instance broker service instance are received and provided to the application. The application uses the instance broker credentials to access the instance broker service instance and determines whether to create a new service instance using the instance broker service instance.

17 Claims, 7 Drawing Sheets

(56) References Cited

U.S. PATENT DOCUMENTS

| | | |
|---|---|---|
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,724,757 B2 | 8/2017 | Barrett |
| 9,851,960 B2 * | 12/2017 | Agostinacchio .......... G06F 8/61 |
| 9,923,905 B2 * | 3/2018 | Amiri ................... H04L 63/123 |
| 2013/0325672 A1 | 12/2013 | Odenheimer et al. |
| 2014/0047319 A1 | 2/2014 | Eberlein |
| 2014/0101099 A1 | 4/2014 | Driesen et al. |
| 2014/0164963 A1 | 6/2014 | Klemenz et al. |
| 2014/0325069 A1 | 10/2014 | Odenheimer et al. |
| 2014/0379677 A1 | 12/2014 | Driesen et al. |
| 2015/0006608 A1 | 1/2015 | Eberlein et al. |
| 2015/0100546 A1 | 4/2015 | Eberlein et al. |
| 2015/0178332 A1 | 6/2015 | Said et al. |
| 2017/0025441 A1 | 1/2017 | Mori |
| 2017/0195332 A1 * | 7/2017 | Wu ................ G05B 19/41885 |
| 2017/0222999 A1 * | 8/2017 | Banga .................... H04L 63/08 |
| 2017/0223026 A1 * | 8/2017 | Amiri ................... H04L 63/101 |
| 2017/0223057 A1 * | 8/2017 | Amiri .................... H04L 63/20 |
| 2017/0223138 A1 * | 8/2017 | Amiri .................... H04L 67/32 |

* cited by examiner

APPLICATION MANAGED SERVICE INSTANCES

BACKGROUND

Microservice-oriented application platforms (for example, XS ADVANCED or underlying CLOUD FOUNDARY PaaS) manage services as resources that are instantiated and bound at deployment time by an application operator. This is an appropriate model for applications that only require a fixed number of instances (typically one) of a particular type, such as a schema in a database. However, for multi-tenancy capable applications that leverage service instances for tenant separation (for example, each tenant stores its data in a separate schema), this static binding is not sufficient. Such applications need to create additional instances at runtime whenever a new tenant is added and they also need to connect to any one of these instances when processing a request for a specific tenant.

SUMMARY

The present disclosure describes methods and systems, including computer-implemented methods, computer program products, and computer systems for allowing applications to dynamically manage service instances.

In an implementation, a request is received from a deployer associated with an application to create an instance broker service instance. A request is received from the deployer to bind the instance broker service instance to the application. Instance broker credentials associated with the instance broker service instance are received and provided to the application. The application uses the instance broker credentials to access the instance broker service instance and determines whether to create a new service instance using the instance broker service instance.

Particular implementations of described methods and systems can include corresponding computer systems, apparatuses, or computer programs (or a combination of computer systems, apparatuses, and computer program) recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, causes the system to perform the actions. One or more computer programs can be configured to perform particular operations or actions by virtue of including instructions that, when executed by data processing apparatus, cause the apparatus to perform the actions.

The above-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, the described application managed service instances concept leverages existing functionality and implementations for service instance creation and binding to provide dynamic service instance provisioning for multi-tenancy and other use cases. Second, the concept is a fully compatible extension of existing interfaces. Third, the extensions significantly enhance service instance management for applications that is both simple for applications to consume and simple to provide by extending existing service broker implementations. Fourth, the described subject matter enables service specific enhancements to be implemented in a generic way. For example, a template database schema can be created, and whenever a new service instance for a tenant is created, the template is copied to the new instance when applicable to the new service instance (for example, for a database service, but not necessarily for a message queue). In this way, all required database tables, views, stored procedures etc. are prepared for immediate use. The presented concept permits such additional steps to be implemented in a specific instance broker for a service as each service type has its own (not just a generic) instance broker. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
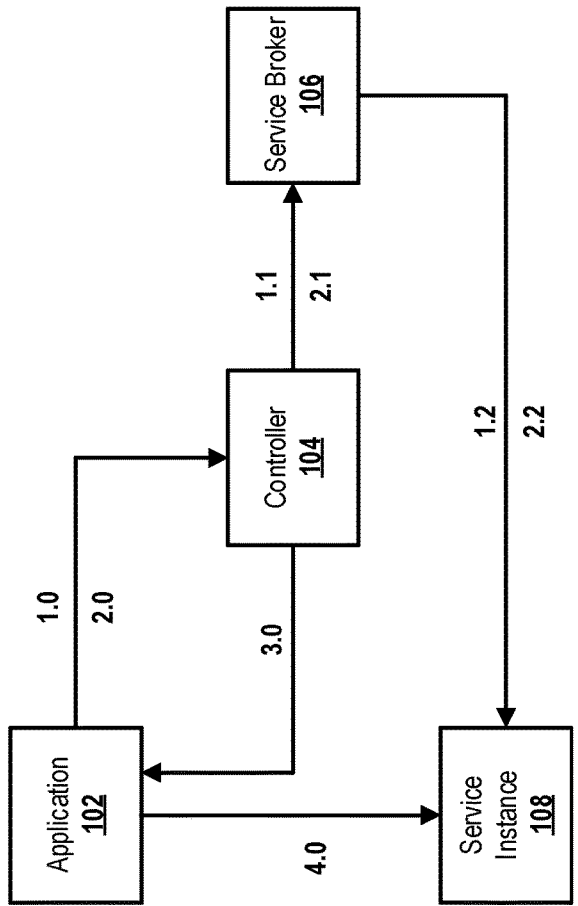
FIG. 1 is a block diagram illustrating current static component/data relationships for application service instance management with a service broker, according to an implementation.

The following detailed description describes allowing applications to dynamically manage service instances and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

Because users expect a rich, interactive, and dynamic experience, an online or network-available software application (hereinafter, "application") must be scalable, have minimal downtime, and be cloud-computing-environment enabled. Monolithic applications cannot meet these requirements. However, in a microservices architecture (MSA), an application is split into a number of individually-deployable, narrowly-focused, re-usable, fault-tolerant software services (hereinafter, "services") (which can each be broken down into additional supporting "sub" services) organized around capabilities (for example, a database persistence service, email sending service, job scheduling service, user interface management, and the like). Services can be implemented in various software/hardware environments, databases, programming languages, etc. as an interface is used to call particular services. As a change to a small part of the application requires only one or a small number of services to be rebuilt and redeployed, a MSA is naturally modular and allows for a more continuous-delivery-type software development process.

A service binding (for example, a set of key/value pairs containing a service URL and access credentials) is normally used by a particular application to make the application aware of data/interface requirements needed to interact with each of the various services. MSA application platforms (for example, SAP HANA XS ADVANCED or underlying CLOUD FOUNDARY platform-as-a-Service (PaaS)) manage services as resources that are instantiated and bound at deployment time by an application operator. This is an appropriate model for applications that only require a fixed number of instances (typically one) of a particular type, such as a schema in a database. However, for multi-tenancy capable applications that leverage service instances for tenant separation (for example, each tenant stores its data in a separate schema), this static binding is not sufficient. Such applications need to create additional instances at runtime whenever a new tenant is added and they also need to connect to any one of these instances when processing a request for a specific tenant. In order to overcome this restriction, a new component (an instance broker) is introduced that extends the functionality of a service broker that handles static instance creation and binding by providing applications with the ability to dynamically manage service instances.

FIG. 1 is a block diagram illustrating component/data relationships 100 for current static application service instance management with a service broker, according to an implementation. FIG. 1 is provided for example purposes only to enhance understanding of the presented concepts. As will be appreciated for those of ordinary skill in the art, there are a myriad of other ways to present or arrange the presented components, structure their interactions, describe inter/intra-component interactions/communications, etc. In as far as they are consistent with this disclosure, these other possible orientations, arrangements, etc. are considered to be within the scope of this disclosure.

At a high-level and in current static implementations of service instance management, a generic middleman-type controller 104 component is used to create an instance of a service (for example, service instance 108) for an application 102. The controller 104 is used to call a service broker 106 component which creates and obtains binding credentials (for example, a service binding as described above) for the requested service instance. The binding credentials are passed to the controller 104 and used to bind the application 102 to the service instance 108 using the binding credentials. Note that numbers associated with connecting arrows in FIG. 1 (for example, 1.0, 1.1, 1.2, etc.) are used in FIG. 2 for referential purposes to tie together the corresponding relationships between components).

Application 102 is a software application that implements execution logic and leverages a shared service that lives outside of its own implementation. Although the service is shared, each application has one (or more) isolated space(s) in the service called service instance(s) 108. A service instance 108 is a space within a shared service provided to an application 102. In the example of a database service, the service is the database system and the service instance 108 is a database schema in that database system.

Service broker 106 manages (or brokers) the instances in a shared service. There is a dedicated service broker 106 for each service type. The service broker 106 is configured to create an instance of a specific service and is able to provide connection parameters and credentials to applications 102 that need to access a service instance 108.

Controller 104 is the middleman between applications 108 and service brokers 106. The controller 104 knows about all service brokers 106 available in a system and mediates requests from applications 102 requesting service instances 108 of a specific type to the appropriate service broker 106. In some implementations, the controller 104 can also cache connection parameters and credentials provided by a service broker 106 so that repeated binding requests from an application 102 to the same service instance 108 can be processed by the service broker 106 without the need to query the service broker 106 again.

Figure 2:
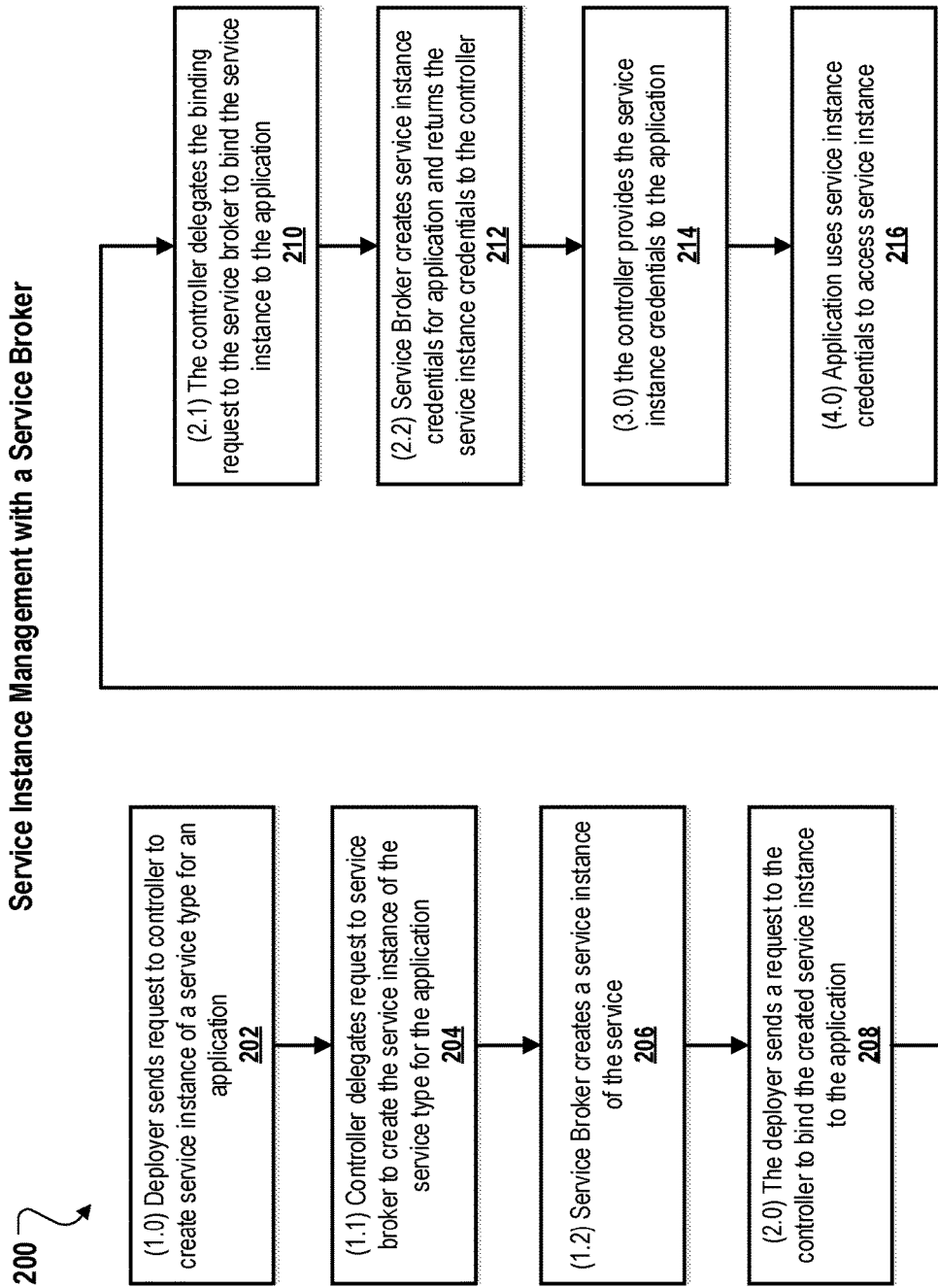
FIG. 2 is a flowchart of an example method for current static application service instance management with a service broker, according to an implementation.

FIG. 2 is a flowchart of an example method 200 for current static application service instance management with a service broker, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At 202, (1.0) before an application is deployed, a service instance for the application is created and bound to the application 102 by a request sent by a deployer (not illustrated) to a controller 104 to create service instance 108 of a service type for the application 102. For example, each application 102 can have a service plan—data that describes what services each application should be configured to use. Service plans are typically stored in an accessible location by the service broker 106. The controller 104 can query the instance broker for a list of available service plans available to the particular application 102.

In the static case example of FIGS. 1 & 2, the deployer is typically a third-party that creates and binds the service instance 108 to an application, not the application itself. The deployer can read an application 102-associated service plan and tell the controller 104 what service(s) 108 that the application 102 wishes to use. Logically, this is done on behalf of the application 102 (in this and corresponding steps of method 200). For simplicity reasons, in the provided example of FIGS. 1 & 2, a corresponding arrow (1.0) for the request sent to the controller is illustrated as starting at the application 102. Technically these steps are not typically implemented inside of the application 102 itself.

Each application 102 can receive a service instance 108. For example, in the case of a database, five different applications 102 can use the same database, but there would be five separate service instances 108 created (in the database context, each application would receive their own schema as to not interfere with each other). From 202, method 200 proceeds to 204.

At 204, (1.1) the controller 104 delegates the deployer service request to a service broker 106 to create the service instance 108 of the service type for the application 102. Here, the controller 104 calls the service broker 106 (each service-type has its own service broker 106). At a lower-level, the controller 104 calls an interface (not illustrated) for a particular service broker as the controller 104 is aware of the type of service that is needed. Data describing particulars of the interface called can be swapped depending upon the type of service needed. For example, if it is desired to switch database types, version, etc., a data structure describing the database a controller should use to initiate generation of a database service can be modified and the controller 104 will call the updated interface information of an appropriate service broker 108. From 204, method 200 proceeds to 206.

At 206, (1.2) the service broker 108 creates (or initiates creation of) a service instance 108 of the service type (for example, create a database schema). Binding credentials are obtained by the service broker 106. From 206, method 200 proceeds to 208.

At 208, (2.0) the deployer sends a request to the controller 104 to bind the created service instance 108 to the application 102. From 208, method 200 proceeds to 210.

At 210, (2.1) the controller 104 delegates the binding request to the service broker 106 to bind the service instance 108 to the application 102. From 210, method 200 proceeds to 212.

At 212, (2.2) the service broker 106 creates service instance credentials for the application 102 (for example, create a database user with access to the associated schema) and returns the credentials to the controller 104. From 212, method 200 proceeds to 214.

At 214, (3.0) the controller 104 provides the service instance credentials to the application to bind the service instance 108 to the application 102. For example, the controller 104 can inject parameters/credentials into the environment of the application 102 to effect the binding. From 214, method 200 proceeds to 216.

At 216, (4.0) the application 102 is started and can use the service instance credentials to access the bound service instance 108. With this approach the application 102 is statically bound to the particular service instance 108 that can be used during the application 102 runtime. In this example, if the particular service instance 108 crashes or is rendered somehow unreachable by the application 102, the application 102 has no ability to use a different service instance 108 as it is tied to the one that failed. From 216, method 200 stops.

Enhanced Functionality Through an Instance Broker

In the case of an application that can be used by more than one customer in a cloud-computing-type environment, the implementation described with respect to FIGS. 1 & 2 is not sufficient. When a user (a tenant) logs into an application in a cloud-computing-type environment, the user is associated with a tenant identifier (for example, a digitally signed ticket associated with the tenant) and used by the application to access and retrieve data for the tenant. While it is possible in some implementations to configure, for example, a database to identify tables as associated with a particular customer/tenant (for example, using a value in each query that is uniquely associated the particular customer/tenant when operating on database tables of a database schema), extensibility, customization, etc. are impacted as changes needed for one tenant end up impacting all tenants (for example, a tenant wants to extend a database table by adding a field—this action increases the size of a database, can impact database performance, etc.). In a multi-tenancy environment, what is needed is for the same application to be able to dynamically use multiple/different service instances (for example, database schemas), each appropriate for a different tenant without the application needing to be deployed multiple times (each deployment for a particular tenant). Instead of directly binding an application to a service instance, an indirection is performed to bind the application to an instance broker service which offers APIs to particular service instances (for example, database schemas). The application 302 can call the instance broker service to dynamically gain access to the service instances.

Figure 3:
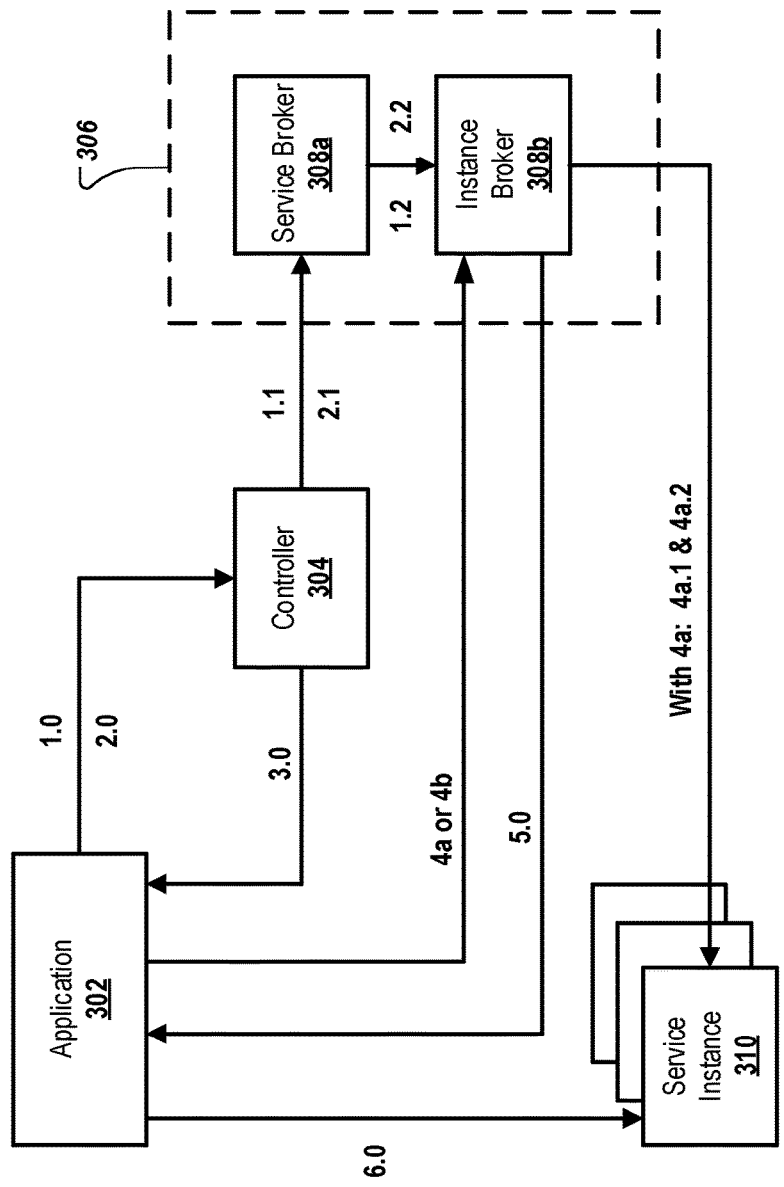
FIG. 3 is a block diagram illustrating component/data relationships for application service instance management with an instance broker, according to an implementation.

Turning now to FIG. 3, FIG. 3 is a block diagram 300 illustrating component/data relationships for application service instance management with an instance broker, according to an implementation. FIG. 3 is provided for example purposes only to enhance understanding of the presented concepts. As will be appreciated for those of ordinary skill in the art, there are a myriad of other ways to present or arrange the presented components, structure their interactions, describe inter/intra-component interactions/communications, etc. In as far as they are consistent with this disclosure, these other possible orientations, arrangements, etc. are considered to be within the scope of this disclosure.

To enhance the functionality of FIGS. 1 & 2, the service broker functionality described is extended by introducing a new component called an instance broker 308b for application managed service instances. Instead of creating and binding an actual service instance to the application 102, an instance of an instance broker 308b can be created and bound to the application 102 in the same way as regular service instances (for example, service instances 108 of FIGS. 1 & 2) are created and bound. Note that functionality described above with respect to FIGS. 1 & 2 can also be available to components of FIGS. 3 & 4A-4C (for example, the controller 304 can access service plans stored by the service broker 308a similar to the description above with respect to controller 104 and service broker 106). In some implementations, corresponding components between FIGS. 1 and 3 can share some or all of the same functionality.

At a high-level, a request is sent to the controller 304 by a deployer (as described above) to create a new service instance 310. However, in the enhancement, the new service instance 310 is not created following a regular service plan (as described above), but with data called an instance broker plan (described below). Instance_broker plans are typically stored in an accessible location by the instance broker 308b. The controller 304 can query the instance broker for a list of available commands available to the particular application 302.

A request from the deployer is sent through the controller 304 to the service broker 308a (enhanced for application managed service instances) to create an instance of an instance broker 308b. With a request to bind to the application 302, the application 302 is bound to the instance of the instance broker 308b instead of a created service instance 310. The service broker 308a does not create a service instance (for example service instance 108 as described in FIGS. 1 & 2 or service instance 310 as described in FIGS. 3 & 4), but the instance of the instance broker 308b is used by the interfacing application 302 to create service instances 310.

There are two primary envisioned implementations of the instance broker 308b. In one case, the instance broker 308b can be implemented as a separate service running independently of the illustrated corresponding service broker 308a. In this case, the dotted line 306 can be omitted from FIG. 3.

Alternatively, and more naturally, the instance broker 308b can also be implemented as an additional component in the service broker 308a itself (for example, represented as service broker 306 in this configuration) to allow reuse of functionality for creating service instances and creating instance credentials with a different set of service interfaces that supplement an original service broker 308a application programming interface (API). In this case, dotted line 306 remains in FIG. 3 to indicate this relationship between the service broker 308a and the instance broker 308b and a single component with both interfaces can be made available and in its internal implementation it can reuse the code that the service broker would use to instantiate a service instance 310. As instance broker credentials are provided by the service broker 308a to the controller 304/application 302, either implementation choice is transparent to consuming applications 302 (neither the application 302 nor the controller 304 know whether the service broker 308a and instance broker 308b are implemented independently or as a single component, the APIs are the same, and only the URL to the instance broker needs to be configured as the same as or different than the service broker 308a). Either implementation is considered to be within the scope of this disclosure.

One essential difference between the service broker 308a and the instance broker 308b service interfaces is that the service broker 308a is invoked by the controller 104 with credentials defined when the service broker 308a is registered with the controller 104. The instance broker 308b service interfaces, however, are invoked directly by the application 102 with credentials provided by the service broker 308a when an instance broker instance is bound to the application 102.

As the instance broker 308b can be considered itself in a service plan associated with the service broker 308a, the instance broker 308b service interface needs to provide a parameter to specify a particular service plan that an application 102 wishes to use when creating a service instance 310. The instance broker 308b can then use the same implementation as the service broker 308a to create a service instance 310 for the corresponding service plan.

Figure 4A:
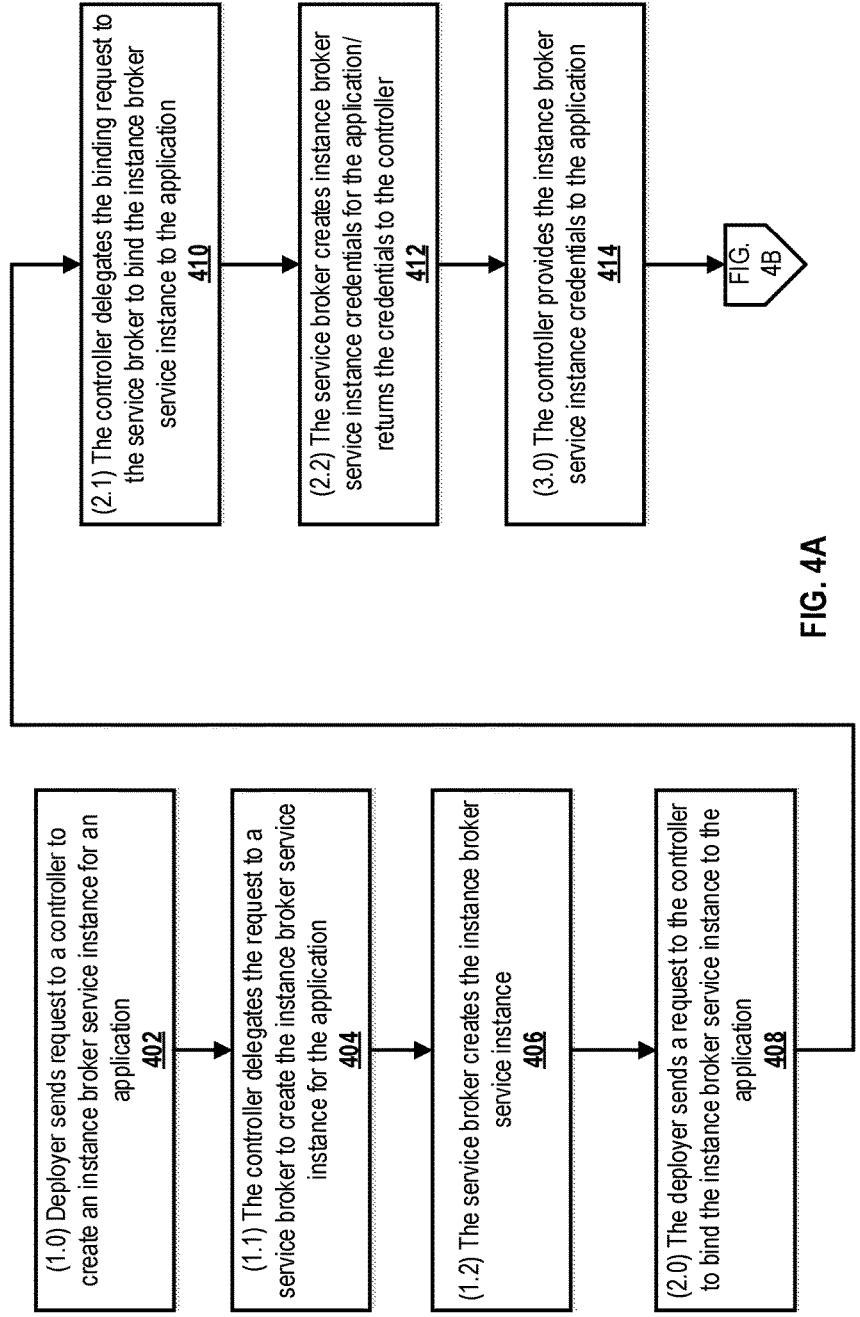
FIGS. 4A-4C illustrate a flowchart of an example method for application service instance management with an instance broker, according to an implementation.
Figure 4B:
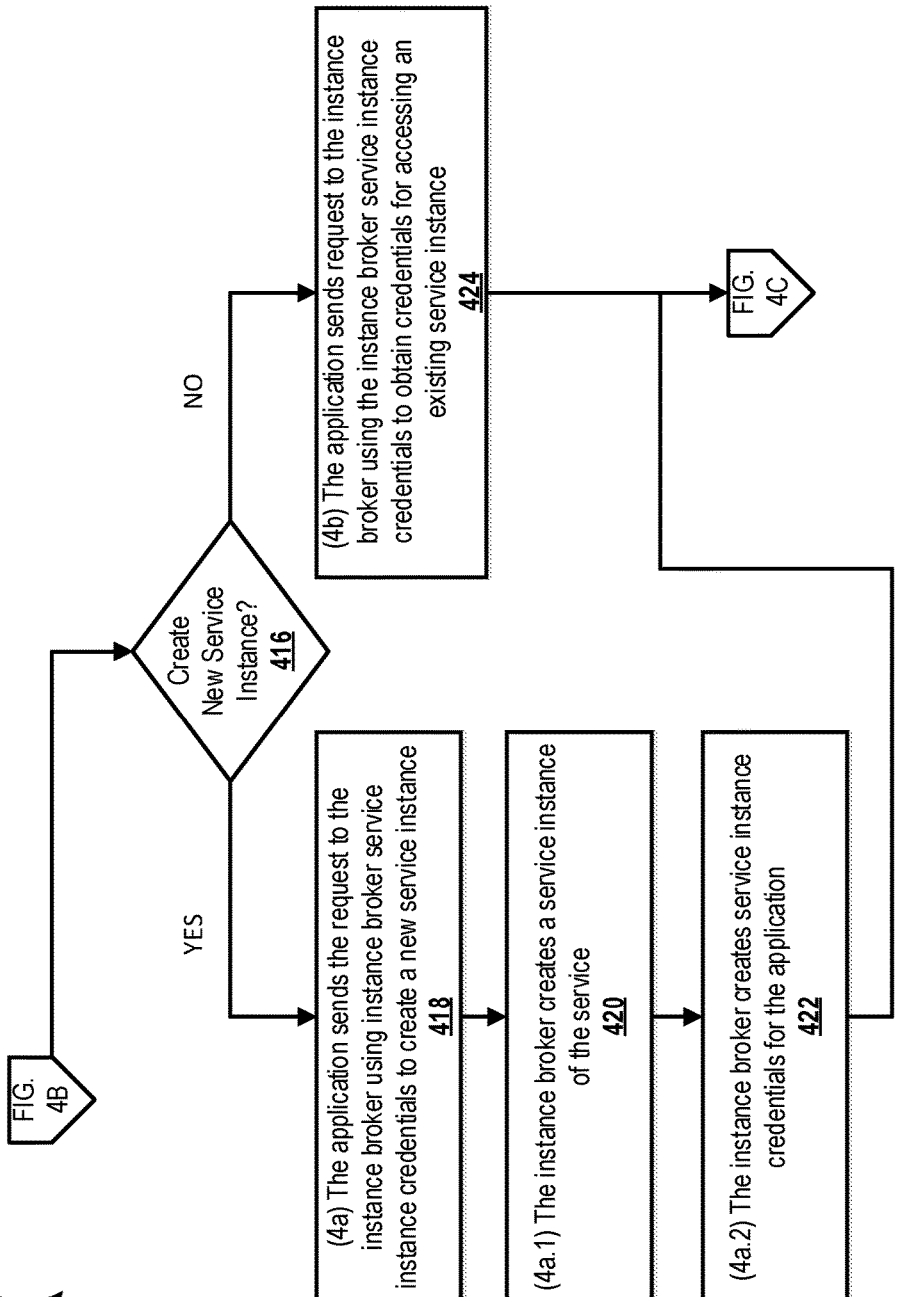
Figure 4C:
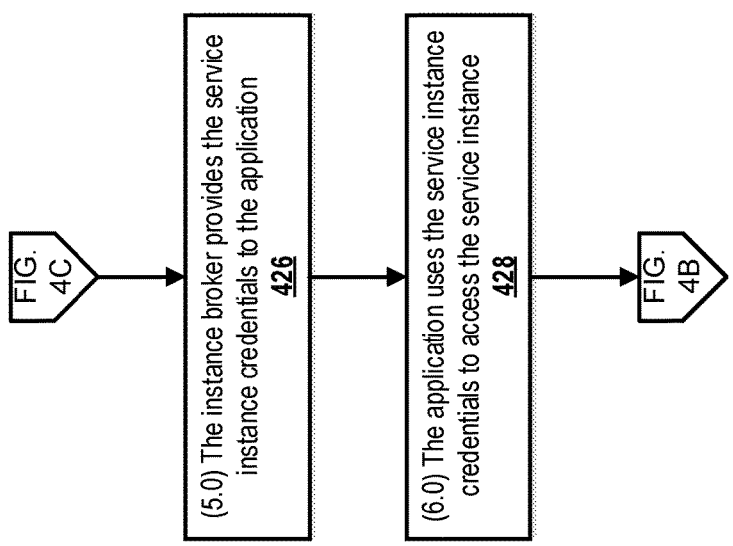

FIGS. 4A-4C illustrate a flowchart of an example method 400 (as 400a-400c) for application service instance management with an instance broker, according to an implementation. For clarity of presentation, the description that follows generally describes method 400 in the context of the other figures in this description. However, it will be understood that method 400 may be performed, for example, by any suitable system, environment, software, and hardware, or a combination of systems, environments, software, and hardware as appropriate. In some implementations, various steps of method 400 can be run in parallel, in combination, in loops, or in any order.

At 402, (1.0) a deployer (not illustrated) sends request to a controller 304 to create an instance broker service instance (308b) for an application 302. From 402, method 400 proceeds to 404.

At 404, (1.1) the controller 304 delegates the request to a service broker 308a to create the instance broker service instance 308b for the application 302. From 404, method 400 proceeds to 406.

At 406, (1.2) the service broker 308a creates the instance broker service instance 308b. Note that if there are two separate application, in typical implementation, each application would be bound to its own instance broker service instance 308b (each instance broker 308b manages all service instances 310 for its associated application 302). From 406, method 400 proceeds to 408.

At 408, (2.0) the deployer sends a request to the controller 304 to bind the instance broker service instance 308b to the application 302. From 408, method 400 proceeds to 410.

At 410, (2.1) the controller 304 delegates the binding request to the service broker 398a to bind the instance broker service instance 308b to the application 302. From 410, method 400 proceeds to 412.

At 412, (2.2) the service broker 308a creates instance broker service instance credentials for the application 302 and returns the credentials to the controller 304. From 412, method 400 proceeds to 414.

At 414, (3.0) the controller 304 provides the instance broker service instance credentials to the application 302 (as above with FIG. 2, the controller 304 can inject parameters/credentials into the environment of the application 302 to effect the binding with the instance broker service instance 308b). From 414, method 400 proceeds to 416 in FIG. 4B.

Note that path (4a) and (4b) are two alternative routes in method 400, depending on the lifecycle of the service instance 310. (4a) is a path for creating a new service instance 310, while (4b) is the path for accessing an existing service instance 310. At 416, the application 302 makes a determination as to whether to create a new service instance 310: If it is determined that a new service instance 310 is to be created, method 400 proceeds to 418. Otherwise, if it is determined that a new service instance 310 is not be created, method 400 proceeds to 424. In typical scenarios, the application 302 retrieves credentials of a service instance 310, connects to the service instance 310, and uses it. When creating a new service instance 310, an onboarding process (not illustrated) implemented in the application 302 and used by a cloud-computing tenant (for example, to log in, sign up, etc.) is used to initiate creation of a desired service instance 310.

At 418, (4a) the application 302 sends the request to the instance broker 308b using instance broker service instance credentials to create a new service instance. Here the unique tenant ID would also be passed to the instance broker. From 418, method 400 proceeds to 420.

At 420, (4a.1) the instance broker 308b creates a service instance 310 of the service (for example, create a database schema). From 420, method 400 proceeds to 422.

At 422, (4a.2) the instance broker 308b creates service instance credentials for the application 302 (for example, create a database user with access to the schema using the passed in tenant ID). From 422, method 400 proceeds to 426 in FIG. 4C.

At 424, (4b) the application 302 sends request to the instance broker 308b using the instance broker service instance credentials to obtain credentials for accessing an existing service instance 310. The application 302 retrieves the service instance credentials to such service instances 310 based on an identifier (for example, a cloud-computing environment tenant identifier) that was used when the service instance 310 was created. From 424, method 400 proceeds to 426 in FIG. 4C.

At 426, (5.0) the instance broker 308b provides the service instance credentials to the application 302. From 426, method 400 proceeds to 428.

At 428, (6.0) the application 302 uses the service instance credentials to access the service instance 310. After 428, method 400 proceeds back to 416 in FIG. 4B. Note that in a typical implementation, elements of FIG. 4A are executed once. A processing loop begins at the decision point 416 in FIG. 4B. An application is coupled with an instance broker once when it is started. Whenever the application needs to access a service instance, it will loop through the steps starting with 416.

With the described service instance credentials, the application 302 can connect to the actual service instances 310 and dynamically switch between available service instances 310 as required for processing requests for specific tenants. In some implementations, service instance credentials can be cached or open connections can be pooled to minimize overhead created by additional calls to the instance broker 308b.

Note that in multi-tenancy environments, applications often have some tenant-agnostic data (for example, bank routing numbers, configuration data, etc.). An application 302 can still use the approach of FIGS. 1 & 2 to statically bind to a single service instance (for example a database schema) where it keeps all tenant-independent data and then also bind to an instance broker 308b to dynamically gain access to schemas associated with each individual tenant.

A service broker 308a and controller 304 can distinguish between these scenarios by using a service plan. A service broker 308a can offer different service plans (for example, different types of service instances—is a large or small database sufficient, etc.). The above-mentioned instance_broker plan is used when a standard service plan (for example, providing an application direct access to a service instance when using a "schema plan") is not used. Using the instance_broker plan results in the application 302 not gaining direct access to a service instance 310, but to an instance of the instance broker 308b which is used as described above.

In the case of a static binding (for example, described in FIGS. 1 and 2), the controller is necessary because the controller is the only component that can later on inject service binding credentials statically into the an application environment. In the case where an instance broker is used, when an application calls the instance broker, a dynamic binding is received.

In terms of how service plans work in comparison to an instance_broker plan, for example, a service broker may offer three service plans for a database service called SMALL, MEDIUM, and LARGE. The service broker knows how to create a small, medium, or large service instance depending on the selected service plan. With the addition of an instance broker, another plan is added: INSTANCE_BROKER. The service broker is extended so that it create a instance broker instead of a small, medium, or large service instance when this plan is selected.

The instance broker itself offers thru its API (for example, accessed in 418 of FIG. 4) the three original plans: SMALL, MEDIUM, and LARGE (as it would not make sense for an instance broker to offer a plan to create an instance broker from within an instance broker). In the case where the instance broker is considered a component of the service broker (for example, as the service broker 306 configuration) then the component instance broker can just pass the selected plan (SMALL, MEDIUM, or LARGE) to the service broker 306 internal API that actually creates the service instance 310. This way when the service broker 306 adds yet another plan (for example, EXTRA_LARGE), the instance broker does not need to be changed because it simply forwards the plan name passed by the application 302 (for example in 418 of FIG. 4) to that internal service broker's API where the additional plan is implemented just once.

Figure 5:
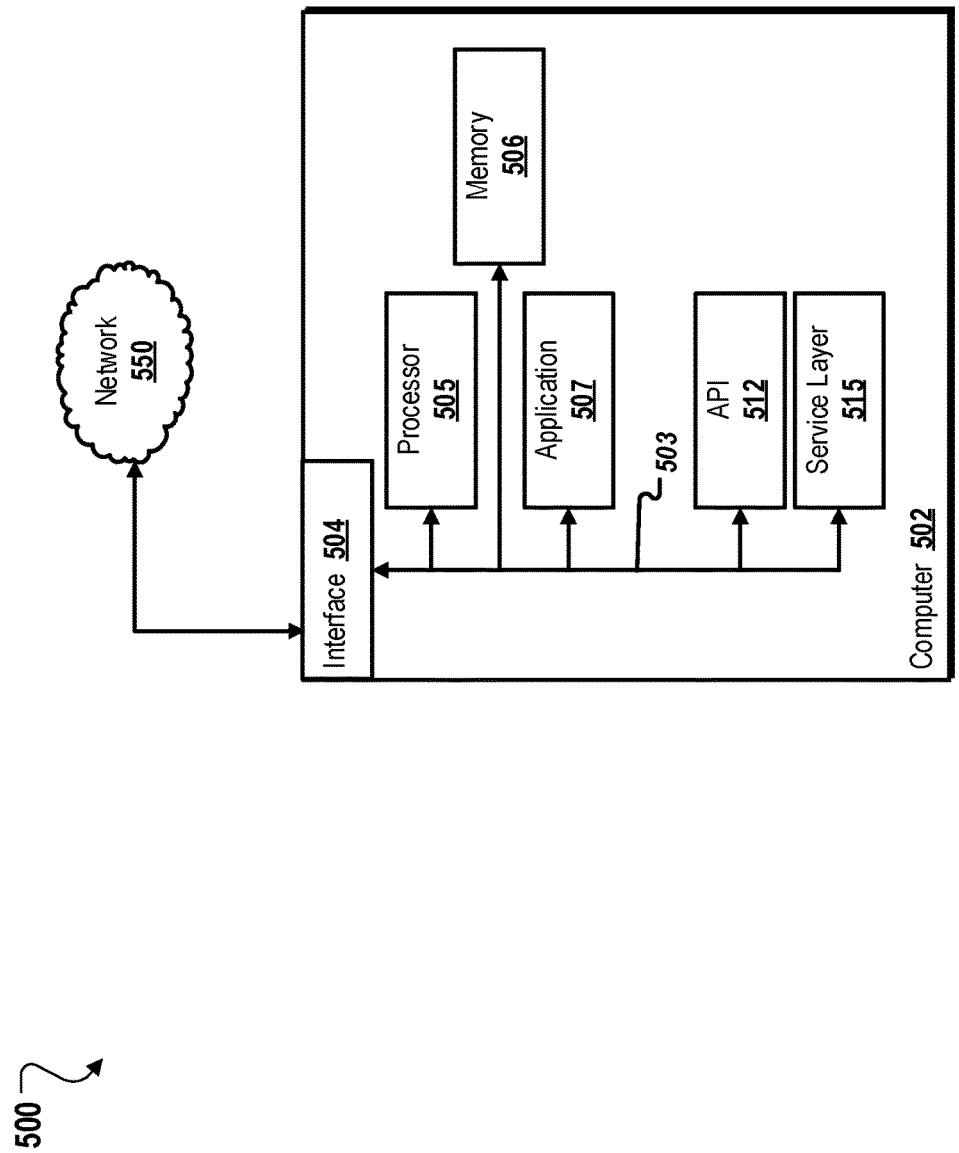
FIG. 5 is a block diagram of an exemplary computer system used to provide computational functionalities associated with described algorithms, methods, functions, processes, flows, and procedures as described in the instant disclosure, according to an implementation.

FIG. 5 is a block diagram 500 illustrating an example computer (for example, computer system 150 of FIG. 1A) used to provide computational functionalities associated with described algorithms, methods, functions, processes, flows, and procedures as described in the instant disclosure, according to an implementation. The example computer system 150 can be located at or near one or more well survey systems or at a remote location.

The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 502 may comprise a computer that includes an input device, such as a keypad, keyboard, touch screen, or other device that can accept user information, and an output device that conveys information associated with the operation of the computer 502, including digital data, visual, or audio information (or a combination of information), or a GUI.

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, business intelligence (BI) server, or other server (or a combination of servers).

The computer 502 can receive requests over network 530 from a client application (for example, executing on another computer 502) and responding to the received requests by processing the said requests in an appropriate software application. In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, both hardware or software (or a combination of hardware and software), may interface with each other or the interface 504 (or a combination of both) over the system bus 503 using an application programming interface (API) 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined business functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems in a distributed environment that are connected to the network 530 (whether illustrated or not). Generally, the interface 504 comprises logic encoded in software or hardware (or a combination of software and hardware) and operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a memory 506 that holds data for the computer 502 or other components (or a combination of both) that can be connected to the network 530 (whether illustrated or not). For example, memory 506 can be a database, RAM, ROM, or other memory storing data consistent with this disclosure. Although illustrated as a single memory 506 in FIG. 5, two or more memories may be used according to particular needs, desires, or particular implementations of the computer 502 and the described functionality. While memory 506 is illustrated as an integral component of the computer 502, in alternative implementations, memory 506 can be external to the computer 502.

The application 507 is an algorithmic software engine providing functionality according to particular needs, desires, or particular implementations of the computer 502, particularly with respect to functionality described in this disclosure. For example, application 507 can serve as one or more components, modules, applications, etc. Further, although illustrated as a single application 507, the application 507 may be implemented as multiple applications 507 on the computer 502. In addition, although illustrated as integral to the computer 502, in alternative implementations, the application 507 can be external to the computer 502.

There may be any number of computers 502 associated with, or external to, a computer system containing computer 502, each computer 502 communicating over network 530. Further, the term "client," "user," and other appropriate terminology may be used interchangeably as appropriate without departing from the scope of this disclosure. Moreover, this disclosure contemplates that many users may use one computer 502, or that one user may use multiple computers 502.

Described implementations of the subject matter can include one or more features, alone or in combination.

For example, in a first implementation, a computer-implemented method, comprising: receiving a request from a deployer associated with an application to create an instance broker service instance; receiving a request from the deployer to bind the instance broker service instance to the application; receiving instance broker credentials associated with the instance broker service instance; providing the instance broker credentials to the application, wherein the application uses the instance broker credentials to access the instance broker service instance; and determining, using the application, whether to create a new service instance using the instance broker service instance.

The foregoing and other described implementations can each optionally include one or more of the following features:

A first feature, combinable with any of the following features, comprising: delegating the request to create an instance broker service instance to a service broker; and creating, using the service broker, the instance broker service instance.

A second feature, combinable with any of the previous or following features, comprising: delegating the binding request to the service broker; and creating, using the service broker, instance broker service credentials.

A third feature, combinable with any of the previous or following features, comprising sending a request to create a new service instance to the instance broker service instance using the instance broker credentials.

A fourth feature, combinable with any of the previous or following features, comprising creating, using the instance broker, a service instance.

A fifth feature, combinable with any of the previous or following features, comprising creating, using the instance broker, service instance credentials.

A sixth feature, combinable with any of the previous or following features, comprising sending a request using the instance broker credentials from the application to the instance broker to obtain service instance credentials for accessing an existing service instance.

In a second implementation, a non-transitory, computer-readable medium storing one or more instructions executable by a computer system to perform operations comprising: receiving a request from a deployer associated with an application to create an instance broker service instance; receiving a request from the deployer to bind the instance broker service instance to the application; receiving instance broker credentials associated with the instance broker service instance; providing the instance broker credentials to the application, wherein the application uses the instance broker credentials to access the instance broker service instance; and determining, using the application, whether to create a new service instance using the instance broker service instance.

The foregoing and other described implementations can each optionally include one or more of the following features:

A first feature, combinable with any of the following features, comprising one or more instructions to: delegate the request to create an instance broker service instance to a service broker; and create, using the service broker, the instance broker service instance.

A second feature, combinable with any of the previous or following features, comprising one or more instructions to: delegate the binding request to the service broker; and create, using the service broker, instance broker service credentials.

A third feature, combinable with any of the previous or following features, comprising one or more instructions to send a request to create a new service instance to the instance broker service instance using the instance broker credentials.

A fourth feature, combinable with any of the previous or following features, comprising one or more instructions to create, using the instance broker, a service instance.

A fifth feature, combinable with any of the previous or following features, comprising one or more instructions to create, using the instance broker, service instance credentials.

A sixth feature, combinable with any of the previous or following features, comprising one or more instructions to send a request using the instance broker credentials from the application to the instance broker to obtain service instance credentials for accessing an existing service instance.

In a third implementation, a computer-implemented system, comprising: a computer memory; and a hardware processor interoperably coupled with the computer memory and configured to perform operations comprising: receiving a request from a deployer associated with an application to create an instance broker service instance; receiving a request from the deployer to bind the instance broker service instance to the application; receiving instance broker credentials associated with the instance broker service instance; providing the instance broker credentials to the application, wherein the application uses the instance broker credentials to access the instance broker service instance; and determining, using the application, whether to create a new service instance using the instance broker service instance.

The foregoing and other described implementations can each optionally include one or more of the following features:

A first feature, combinable with any of the following features, configured to: delegate the request to create an instance broker service instance to a service broker; and create, using the service broker, the instance broker service instance.

A second feature, combinable with any of the previous or following features, configured to: delegate the binding request to the service broker; and create, using the service broker, instance broker service credentials.

A third feature, combinable with any of the previous or following features, configured to send a request to create a new service instance to the instance broker service instance using the instance broker credentials.

A fourth feature, combinable with any of the previous or following features, configured to create, using the instance broker, a service instance and service instance credentials.

A fifth feature, combinable with any of the previous or following features, configured to send a request using the instance broker credentials from the application to the instance broker to obtain service instance credentials for accessing an existing service instance.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    receiving a request from a deployer associated with an application of a multi-tenancy computing environment to create an instance broker service instance;
    delegating the request to create an instance broker service instance to the service broker;
    creating, using the service broker, the instance broker service instance;
    receiving a request from the deployer to bind the instance broker service instance to the application;
    receiving instance broker credentials associated with the instance broker service instance;
    providing the instance broker credentials to the application, wherein the application uses the instance broker credentials to access the instance broker service instance; and
    determining, using the application, whether to create a new service instance using the instance broker service instance.

2. The computer-implemented method of claim 1, comprising:
    delegating the binding request to the service broker; and
    creating, using the service broker, instance broker service credentials.

3. The computer-implemented method of claim 1, comprising sending a request to create the new service instance to the instance broker service instance using the instance broker credentials.

4. The computer-implemented method of claim 3, comprising creating, using the instance broker service instance, a service instance.

5. The computer-implemented method of claim 3, comprising creating, using the instance broker service instance, service instance credentials.

6. The computer-implemented method of claim 1, comprising sending a request using the instance broker credentials from the application to the instance broker service instance to obtain service instance credentials for accessing an existing service instance.

7. A non-transitory, computer-readable medium storing one or more instructions executable by a computer system to perform operations comprising:
    receiving a request from a deployer associated with an application of a multi-tenancy computing environment to create an instance broker service instance;
    delegating the request to create an instance broker service instance to the service broker;
    creating, using the service broker, the instance broker service instance;
    receiving a request from the deployer to bind the instance broker service instance to the application;
    receiving instance broker credentials associated with the instance broker service instance;
    providing the instance broker credentials to the application, wherein the application uses the instance broker credentials to access the instance broker service instance; and
    determining, using the application, whether to create a new service instance using the instance broker service instance.

8. The non-transitory, computer-readable medium of claim 7, comprising one or more instructions to:
    delegate the binding request to the service broker; and
    create, using the service broker, instance broker service credentials.

9. The non-transitory, computer-readable medium of claim 7, comprising one or more instructions to send a request to create the new service instance to the instance broker service instance using the instance broker credentials.

10. The non-transitory, computer-readable medium of claim 9, comprising one or more instructions to create, using the instance broker service instance, a service instance.

11. The non-transitory, computer-readable medium of claim 9, comprising one or more instructions to create, using the instance broker service instance, service instance credentials.

12. The non-transitory, computer-readable medium of claim 7, comprising one or more instructions to send a request using the instance broker credentials from the application to the instance broker service instance to obtain service instance credentials for accessing an existing service instance.

13. A computer-implemented system, comprising:
a computer memory; and
a hardware processor interoperably coupled with the computer memory and configured to perform operations comprising:
receiving a request from a deployer associated with an application of a multitenancy computing environment to create an instance broker service instance;
delegating the request to create an instance broker service instance to the service broker;
creating, using the service broker, the instance broker service instance;
receiving a request from the deployer to bind the instance broker service instance to the application;
receiving instance broker credentials associated with the instance broker service instance;
providing the instance broker credentials to the application, wherein the application uses the instance broker credentials to access the instance broker service instance; and
determining, using the application, whether to create a new service instance using the instance broker service instance.

14. The computer-implemented system of claim 13, configured to:
delegate the binding request to the service broker; and
create, using the service broker, instance broker service credentials.

15. The computer-implemented system of claim 13, configured to send a request to create the new service instance to the instance broker service instance using the instance broker credentials.

16. The computer-implemented system of claim 15, configured to create, using the instance broker service instance, a service instance and service instance credentials.

17. The computer-implemented system of claim 13, configured to send a request using the instance broker credentials from the application to the instance broker service instance to obtain service instance credentials for accessing an existing service instance.

* * * * *